United States Patent
Mc Donald et al.

(10) Patent No.: US 7,946,275 B2
(45) Date of Patent: May 24, 2011

(54) EXTENDING VARIABLE DISPLACEMENT OPERATION THROUGH SPARK KNOCK CONTROL

(75) Inventors: Mike M. Mc Donald, Macomb, MI (US); Frederick J. Rozario, Fenton, MI (US); William C. Albertson, Clinton Township, MI (US)

(73) Assignee: GM Global Technology Operations LLC

( * ) Notice: Subject to any disclaimer, the term of this patent is extended or adjusted under 35 U.S.C. 154(b) by 399 days.

(21) Appl. No.: 12/182,607

(22) Filed: Jul. 30, 2008

(65) Prior Publication Data

US 2010/0024769 A1    Feb. 4, 2010

(51) Int. Cl.
*F02D 7/00* (2006.01)
*F02D 7/02* (2006.01)
(52) U.S. Cl. .......................................... 123/481; 701/54
(58) Field of Classification Search ............ 123/406.21, 123/406.23, 406.29, 406.37, 481, 494, 198 F, 123/198 DB; 701/111, 54, 22; 73/35.14, 35.16, 35.17; 903/902, 903, 918; 180/65.21
See application file for complete search history.

(56) References Cited

U.S. PATENT DOCUMENTS

2006/0025904 A1 *    2/2006   McGee et al. ................ 701/22

FOREIGN PATENT DOCUMENTS

JP          2006307764 A   *   11/2006

OTHER PUBLICATIONS

JP 2006307764 (Miyamoto, Katsuhiko) Nov. 9, 2006 (Machine Translation). [online] [retrieved on Oct. 31, 2010 ]. Retrieved from JPO Database.*

* cited by examiner

*Primary Examiner* — Mahmoud Gimie

(57) ABSTRACT

A control system comprising a spark knock detection module that detects a spark knock in an engine of a hybrid vehicle, and a torque control module that selectively regulates an engine torque output and an electric machine torque output based on the spark knock. A method comprising detecting a spark knock in an engine of a hybrid vehicle, and selectively regulating an engine torque output and an electric machine torque output based on the spark knock.

20 Claims, 5 Drawing Sheets

EXTENDING VARIABLE DISPLACEMENT OPERATION THROUGH SPARK KNOCK CONTROL

FIELD

The present disclosure relates to hybrid vehicles, and more particularly to variable displacement systems in hybrid vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Hybrid vehicles are driven by multiple powerplants including, but not limited to an internal combustion engine and an electric machine. The electric machine functions as a motor/generator. In a generator mode, the electric machine is driven by the engine to generate electrical energy used to power electrical loads or charge batteries. In a motor mode, the electric machine supplements the engine, providing drive torque to drive the vehicle drivetrain.

Hybrid vehicles may include variable displacement and spark knock control systems. Spark knock control systems, such as Electronic Spark Control (ESC), detect spark knock and typically retard spark timing when spark knock is detected. Retarding the spark timing lowers engine torque output and decreases combustion efficiency. Variable displacement systems, such as Active Fuel Management (AFM), deactivate cylinders under low load conditions to improve fuel economy.

SUMMARY

Accordingly, the present disclosure provides a control system comprising a spark knock detection module that detects a spark knock in an engine of a hybrid vehicle, and a torque control module that selectively regulates an engine torque output and an electric machine torque output based on the spark knock. In addition, the present disclosure provides a method comprising detecting a spark knock in an engine of a hybrid vehicle, and selectively regulating an engine torque output and an electric machine torque output based on the spark knock.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
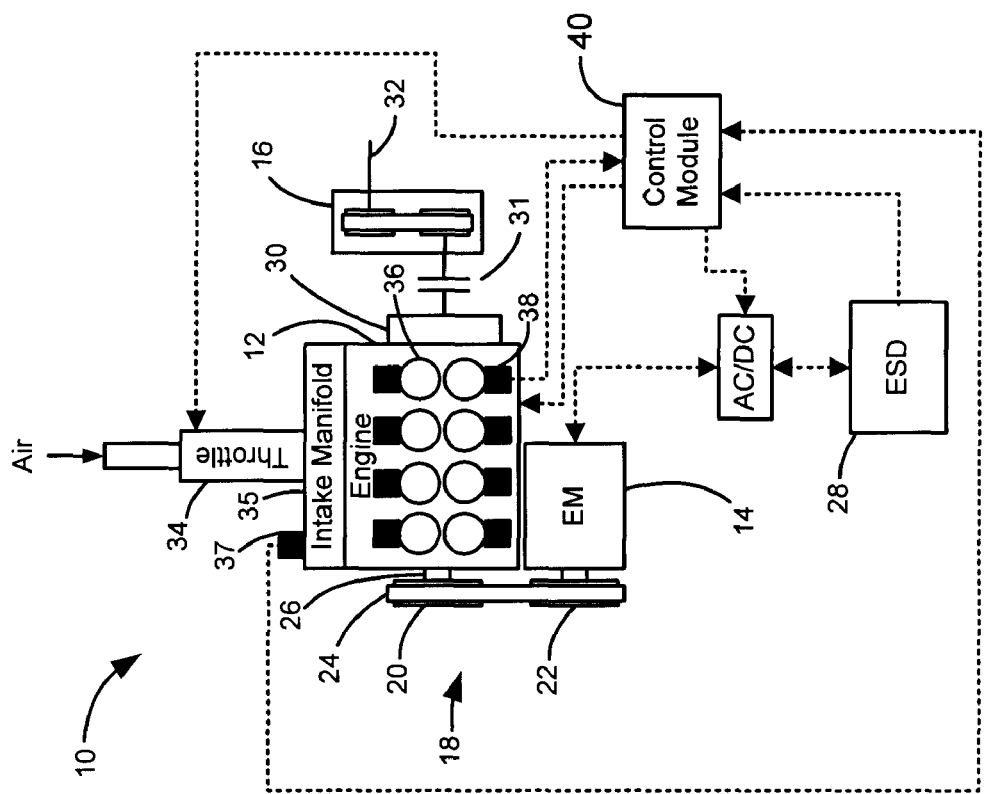
FIG. 1 is a schematic illustration of an exemplary hybrid vehicle that is operated based on a spark knock control system and method according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary hybrid vehicle 10 includes an internal combustion engine (ICE) 12 and an electric machine (EM) 14, which drive a transmission 16. More specifically, the EM 14 supplements the ICE 12 to produce drive torque to drive the transmission 16. In this manner, fuel efficiency is increased and emissions are reduced. The ICE 12 and EM 14 are coupled via a belt-alternator-starter (BAS) system 18. More specifically, the EM 14 operates as a starter (i.e., motor) and an alternator (i.e., generator) and is coupled to the ICE 12 through a belt and pulley system. The ICE 12 and the EM 14 include pulleys 20, 22, respectively, coupled for rotation by a belt 24. The pulley 20 is coupled for rotation with a crankshaft 26 of the ICE 12.

In one mode, the ICE 12 drives the EM 14 to generate power used to recharge an energy storage device (ESD) 28. In another mode, the EM 14 drives the ICE 12 using energy from the ESD 28. The ESD 28 can include, but is not limited to, a battery or a super-capacitor. Alternatively, the BAS system 18 can be replaced with a flywheel-alternator-starter (FAS) system (not shown), which includes an EM operably disposed between the ICE and the transmission or a chain or gear system that is implemented between the EM 14 and the crankshaft 26.

Although the transmission 16 is illustrated as a continuously variable transmission (CVT), the transmission 16 can include, but is not limited to, a CVT, a manual transmission, an automatic transmission and an automated manual transmission (AMT). Drive torque is transferred from the ICE crankshaft 26 to the transmission 16 through a coupling device 30. The coupling device 30 can include, but is not limited to, a friction clutch or a torque converter depending upon the type of transmission implemented. In the case of an automatic transmission, the coupling device 30 is a torque converter including a torque converter clutch (TCC) 31. The transmission 16 multiplies the drive torque through one of a plurality of gear ratios to drive a driveshaft 32.

Air flows into N cylinders 36 of the ICE 12 through a throttle 34 and an intake manifold 35. Although FIG. 1 depicts eight cylinders (N=8), the ICE 12 may include additional or fewer cylinders 36. For example, engines having 4, 5, 6, 8, 10, 12, and 16 cylinders are contemplated. Air is combusted with fuel in the cylinders 36. The combustion process reciprocally drives pistons (not shown) within the cylinders 36. The pistons rotatably drive the crankshaft 26 to provide the drive torque. A pressure sensor 37 detects a pressure in the intake manifold 35 and spark knock sensors 38 detect combustion outside a normal combustion envelope (i.e., spark knock) in the ICE 12.

A control module 40 monitors spark knock in the ICE 12 via the spark knock sensors 38 and may retard spark timing when spark knock is detected. In addition, the control module 40 controls fuel injection and spark to selectively activate and deactivate the cylinders 36. More specifically, when the vehicle 10 is at rest, the control module 40 cuts fuel and spark to the cylinders 36 (i.e., deactivates the cylinders 36) to shut-off the ICE 12. During vehicle launch (i.e., acceleration from rest), the EM 14 drives the crankshaft to spin-up the ICE 12 to an idle speed and to initiate vehicle acceleration. During periods where low drive torque is needed to drive the vehicle 10, the control module 40 employs variable displacement control to deactivate one or more of the cylinders 36. In variable displacement control, the control module 40 may command the ICE 12 and/or the EM 14 to provide the drive torque.

When the control module 40 deactivates one or more of the cylinders 36, the cylinders 36 that are active operate at high specific loads. Spark knock may occur while the cylinders 36 that are active operate at high loads, which may prompt the control module 40 to retard spark timing. To maintain the drive torque while spark timing is retarded, the throttle 34 may be opened further to increase the torque output of the ICE 12. However, opening the throttle 34 further increases pressure in the intake manifold 35, which may cause the control module 40 to activate the cylinders 36 that are deactivated. Switching the cylinders 36 from deactivated to active reduces fuel economy.

The control module 40 regulates operation of the vehicle 10 based on the spark knock control system and method of the present disclosure. The control module 40 detects spark knock in the ICE 12 and selectively regulates the torque output of the ICE 12 and the EM 14 based on spark knock. More specifically, when spark knock is detected, the torque output of the ICE 12 is decreased and the torque output of the EM 14 is increased. The torque adjustment amount may be based on time periods during which spark knock is detected and spark knock is not detected. In this manner, the load on the ICE 12 is reduced to eliminate spark knock while the drive torque is maintained using the EM 14 rather than switching the cylinders 36 from deactivated to active.

Figure 2:
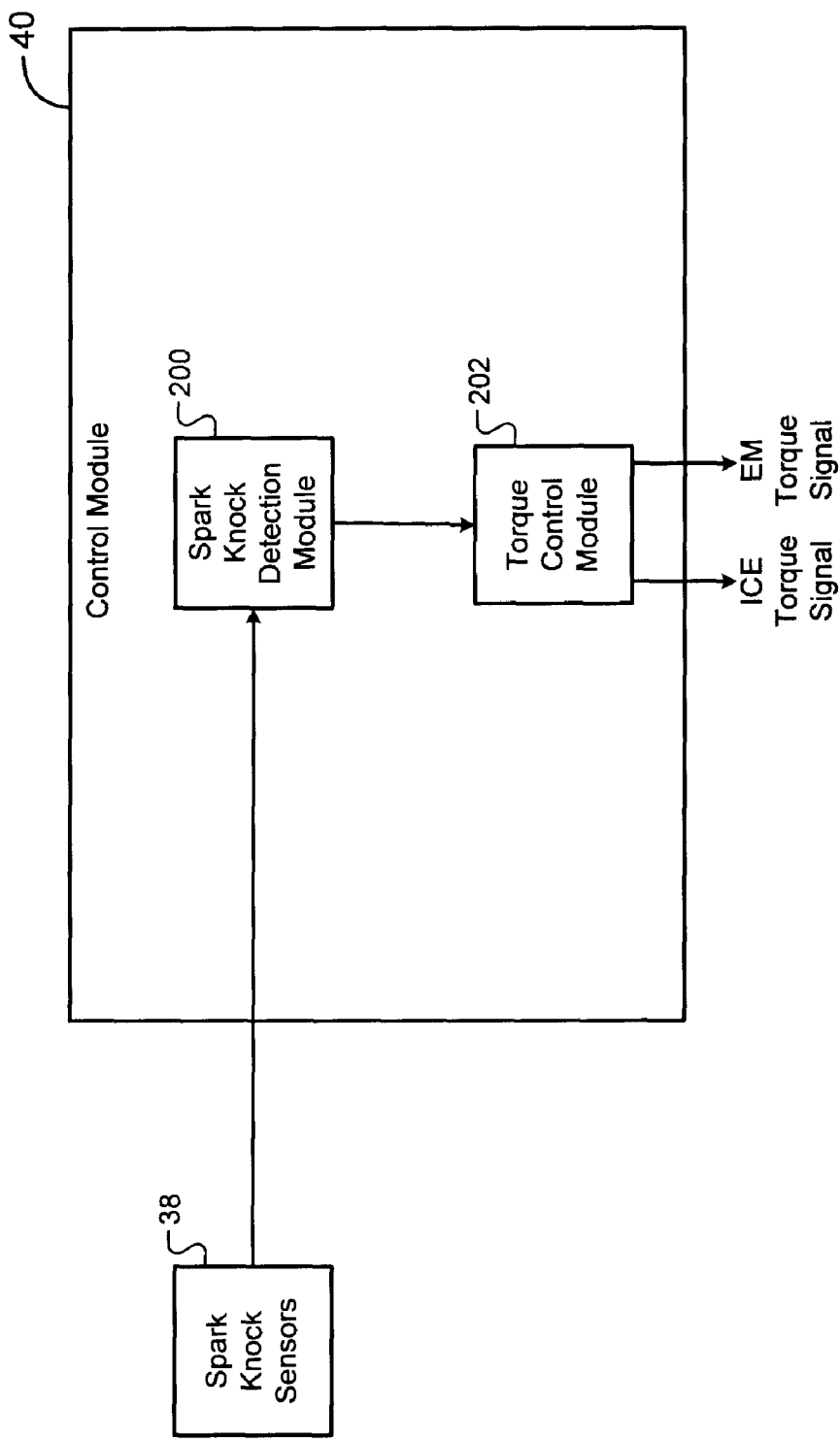
FIG. 2 is a functional block diagram of a control module including a spark knock detection module according to the principles of the present disclosure.

Referring now to FIG. 2, the control module 40 may include a spark knock detection module 200 and a torque control module 202. The spark knock detection module 200 detects spark knock in the ICE 12 based on a signal from the spark knock sensors 38. The spark knock detection module 200 provides a signal indicative of whether spark knock is detected to the torque control module 202. When spark knock is detected, the torque control module 202 provides a control signal to the ICE 12 and the EM 14 to decrease the torque output of the ICE 12 and increase the torque output of the EM 14.

Figure 3:
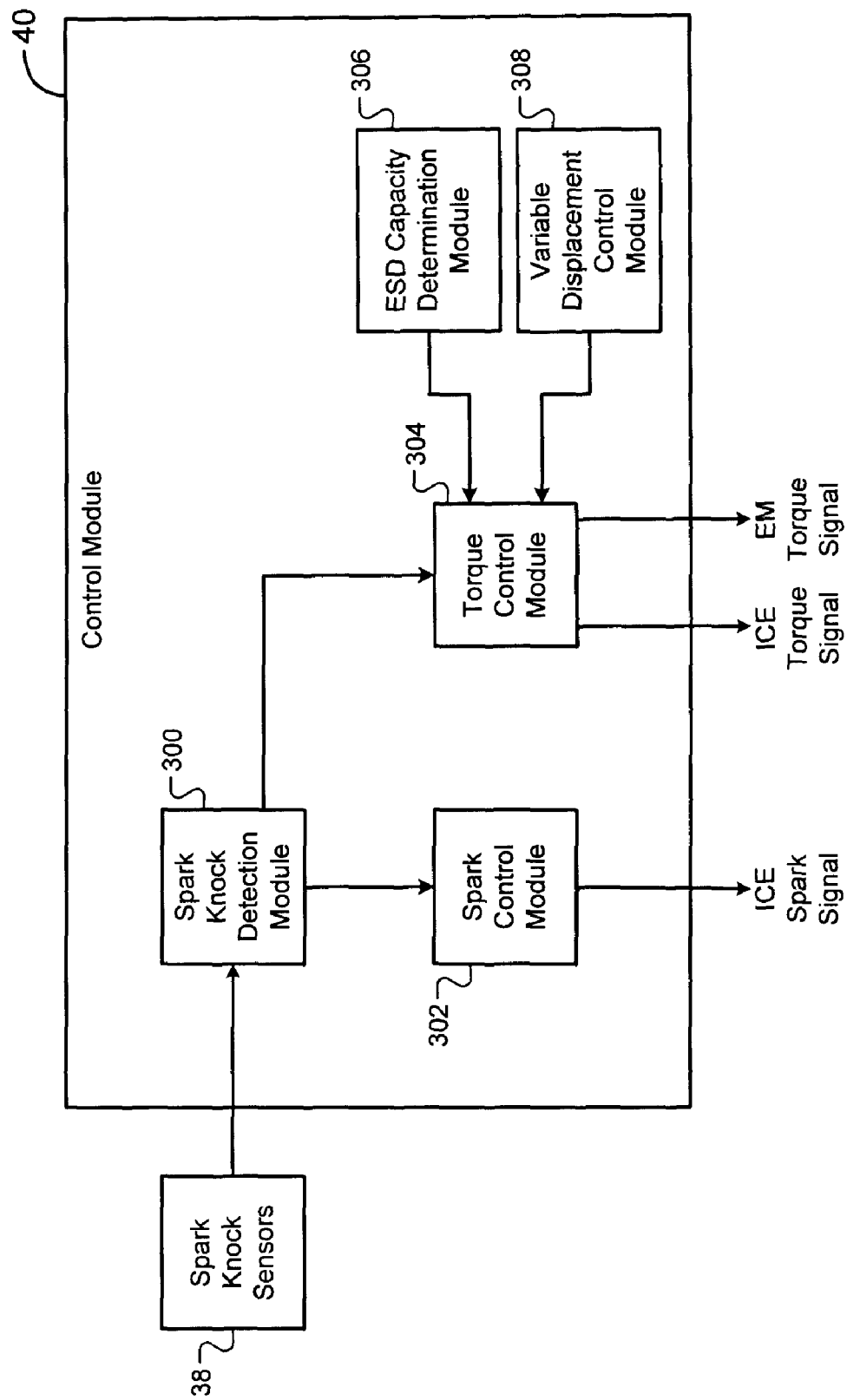
FIG. 3 is a functional block diagram of a control module including a spark control module according to the principles of the present disclosure.

Referring now to FIG. 3, the control module 40 may include a spark knock detection module 300, a spark control module 302, a torque control module 304, an ESD capacity determination module 306, and a variable displacement control module 308. The spark knock detection module 300 detects spark knock in the ICE 12 based on a signal from the spark knock sensors 38. The spark knock detection module 300 provides a signal indicative of the presence of spark knock to the spark control module 302 and the torque control module 304.

The spark control module 302 provides a control signal to the ICE 12 to control spark timing in the ICE 12. The spark control module 302 selectively controls spark timing in the ICE 12 based on the signal from the spark knock detection module 300. More specifically, when spark knock is detected, the spark control module 302 retards spark timing in the ICE 12 to eliminate spark knock.

The ESD capacity determination module 306 determines an ESD state-of-charge (i.e., ESD capacity) based on a signal from the ESD 28. The variable displacement control module 308 determines whether one or more of the cylinders 36 are deactivated (i.e., a variable displacement or AFM state). The variable displacement control module 308 may deactivate one or more of the cylinders 36 based on a signal from the pressure sensor 37 indicative of a pressure in the intake manifold 35. The ESD capacity determination module 306 and the variable displacement control module 308 provide signals indicative of the ESD capacity and the variable displacement state, respectively, to the torque control module 304.

The torque control module 304 selectively provides a signal to the spark control module 302 to disable spark retard and selectively regulates the torque output of the ICE 12 and the EM 14 based on the presence of spark knock, the ESD capacity, and the variable displacement state. When the variable displacement state indicates one or more of the cylinders 36 are deactivated, the torque control module 304 determines whether the ESD capacity exceeds a capacity threshold, or a minimum capacity required to increase the torque output of the EM 14 by an amount that allows an adequate reduction of load on the ICE 12 to eliminate spark knock. When the ESD capacity exceeds the capacity threshold, the torque control module 304 provides the signal to the spark control module 302 to disables spark retard based on spark knock.

When one or more of the cylinders 36 are deactivated and the ESD capacity exceeds the capacity threshold, the torque control module 304 increases or decreases a counter based on the presence of spark knock and adjusts the torque output of the ICE 12 and the EM 14 based on the counter. When the signal from the spark knock detection module 300 indicates that spark knock is detected, the torque control module 304 increases the counter at a predetermined increasing rate. When the signal from the spark knock detection module 300 indicates that spark knock is not detected, the torque control module 304 decreases the counter at a predetermined decreasing rate. The increasing rate is preferably greater than or equal to the decreasing rate. The torque control module 304 sets a torque adjustment amount equal to the product of the counter and a predetermined multiplier (i.e., calibration factor), then respectively decreases and increases the torque output of the ICE 12 and the EM 14 by the torque adjustment amount.

Figure 4:
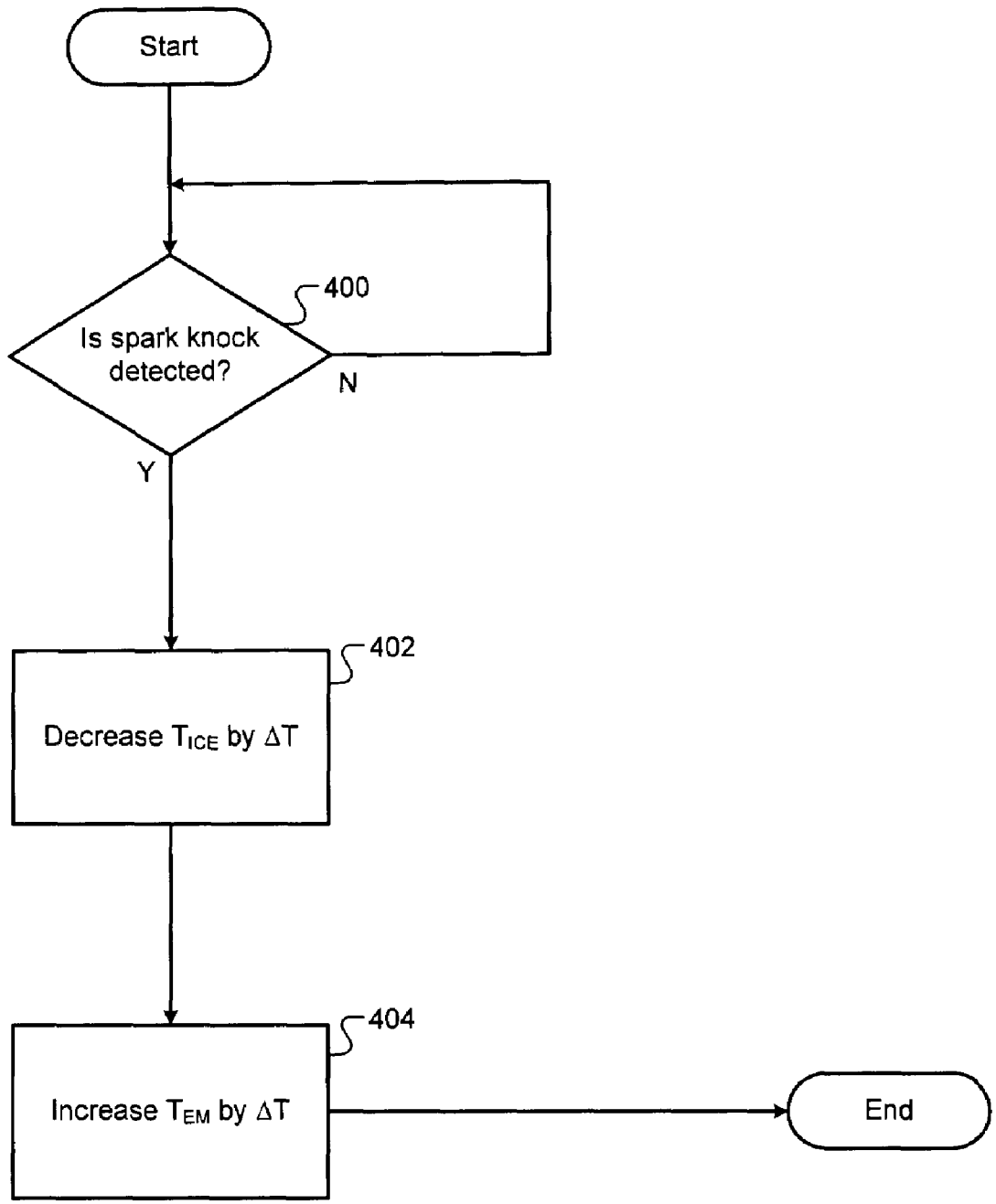
FIG. 4 is a flowchart illustrating exemplary steps of a spark knock control method according to the principles of the present disclosure.

Referring now to FIG. 4, exemplary steps of a spark knock control method are illustrated. In step 400, control determines whether spark knock is detected. When spark knock is detected, control decreases the torque output of the ICE 12 ($T_{ICE}$) and increases the torque output of the EM 14 ($T_{EM}$) in steps 402 and 404, respectively. $T_{ICE}$ and $T_{EM}$ are respectively decreased and increased by a torque adjustment amount ($\Delta T$), which may be predetermined. When spark knock is not detected, control returns to step 400.

Figure 5:
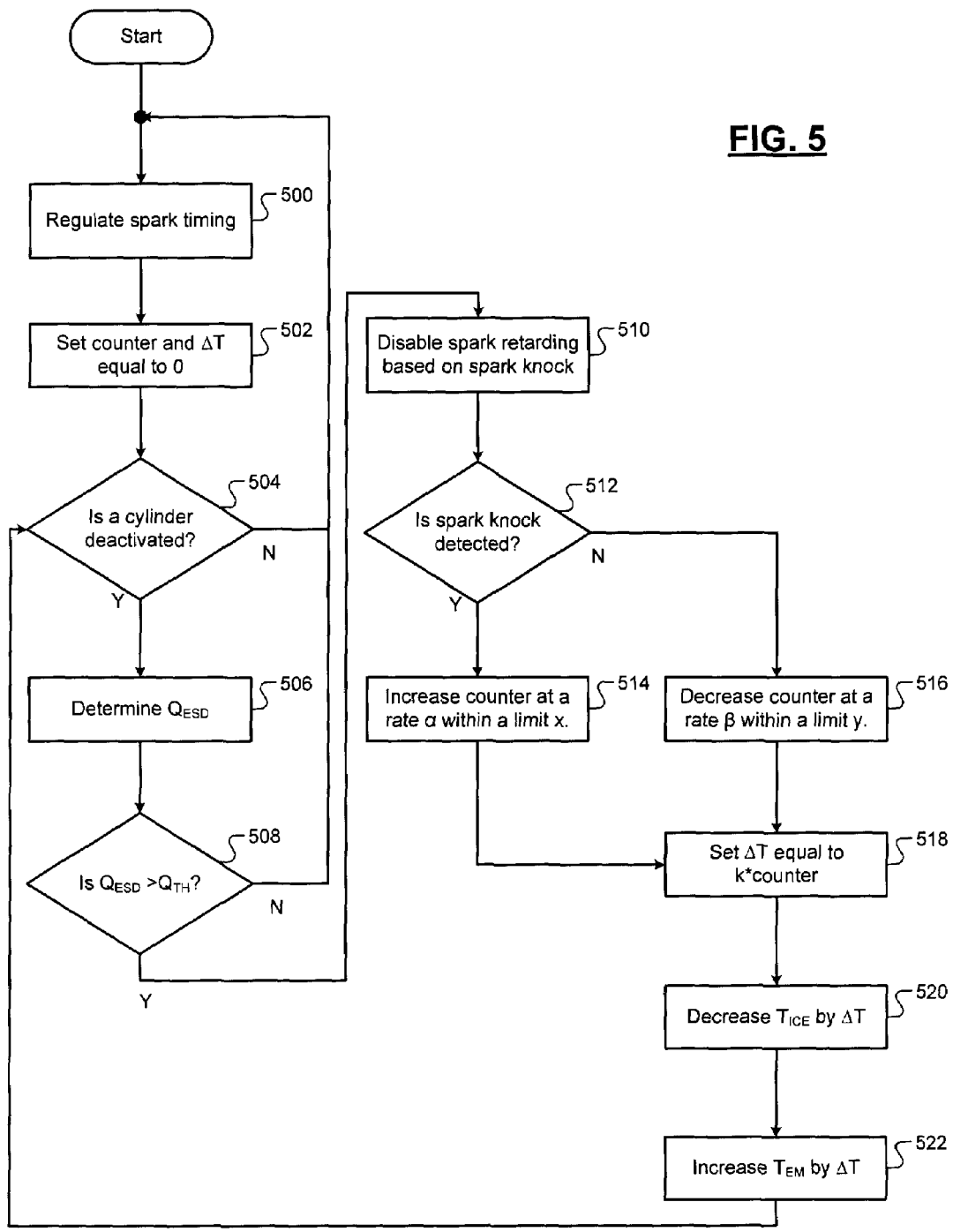
FIG. 5 is a second flowchart illustrating exemplary steps of a spark knock control method according to the principles of the present disclosure.

Referring now to FIG. 5, alternate exemplary steps of a spark knock control method are illustrated. In step 500, control regulates spark timing in the ICE 12, including retarding spark based on the presence of spark knock. In step 502, control sets a counter and a torque adjustment amount equal to 0.

In step 504, control determines whether a cylinder in the ICE 12 is deactivated. When none of the cylinders in the ICE 12 are deactivated, control returns to step 500. When a cylinder in the ICE 12 is deactivated, control determines a capacity of the ESD 28 ($Q_{ESD}$) in step 506.

In step 508, control determines whether $Q_{ESD}$ exceeds a predetermined capacity threshold ($Q_{TH}$). When $Q_{ESD}$ does not exceed $Q_{TH}$, indicating the ESD 28 has insufficient capacity to increase the torque output of the EM 14 by an amount that allows an adequate reduction of load on the ICE 12 to eliminate spark knock, control returns to step 500. When $Q_{ESD}$ exceeds $Q_{TH}$, control disables spark retard based on spark knock in step 510.

In step 512, control determines whether spark knock is detected. When spark knock is detected, control increases a counter at a predetermined rate ($\alpha$) within a predetermined upper limit (x) in step 514. When spark knock is not detected, control decreases the counter at a predetermined rate ($\beta$) within a predetermined lower limit y in step 516. Preferably, $\alpha$ is greater than or equal to $\beta$ and y is equal to 0. In step 518, control sets a torque adjustment amount ($\Delta T$) equal to the product of the counter and a predetermined multiplier (k). Control decreases the torque output of the ICE 12 ($T_{ICE}$) and increases the torque output of the EM 14 ($T_{EM}$) in steps 520 and 522, respectively, and returns to step 504. While a cylinder in the ICE 12 is deactivated, control cycles through steps 504 to 522 at a predetermined rate y that yields a desired response time.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system, comprising:
    a spark knock detection module that detects a spark knock in an engine of a hybrid vehicle;
    a variable displacement control module that determines when a cylinder of said engine is deactivated; and
    a torque control module that regulates an engine torque output and an electric machine torque output based on said spark knock when said cylinder is deactivated.

2. The control system of claim 1 further comprising
    a spark control module that selectively retards ignition timing in said engine when said spark knock is detected.

3. The control system of claim 2 further comprising a battery capacity determination module that determines a battery capacity of said hybrid vehicle, wherein said spark control module does not retard ignition timing in said engine when said battery capacity exceeds a predetermined threshold.

4. The control system of claim 2 wherein said spark control module disables spark retard based on said spark knock when said cylinder is deactivated.

5. The control system of claim 1 wherein said torque control module:
    increases a counter at a first predetermined rate when said spark knock is detected;
    decreases said counter at a second predetermined rate when said spark knock is not detected; and
    decreases said engine torque output and increases said electric machine torque output based on said counter.

6. The control system of claim 5 wherein said torque control module increases and decreases said counter within predetermined upper and lower limits.

7. The control system of claim 5 wherein said first predetermined rate is greater than or equal to said second predetermined rate.

8. The control system of claim 5 wherein said torque control module decreases said engine torque output by a predetermined multiple of said counter and increases said electric machine torque output by said predetermined multiple of said counter.

9. The control system of claim 5 wherein said torque control module decreases said engine torque output and increases said electric machine torque output at a third predetermined rate.

10. The control system of claim 1 wherein said torque control module decreases said engine torque output and increases said electric machine torque output when said spark knock is detected and said cylinder is deactivated.

11. A method, comprising:
    detecting a spark knock in an engine of a hybrid vehicle;
    determining when a cylinder of said engine is deactivated; and
    regulating an engine torque output and an electric machine torque output based on said spark knock when said cylinder is deactivated.

12. The method of claim 11 further comprising
    selectively retarding ignition timing in said engine when said spark knock is detected.

13. The method of claim 12 further comprising determining a battery capacity of said hybrid vehicle and not retarding ignition timing in said engine when said battery capacity exceeds a predetermined threshold.

14. The method of claim 12 further comprising disabling spark retard based on said spark knock when said cylinder is deactivated.

15. The method of claim 11 further comprising:
    increasing a counter at a first predetermined rate when said spark knock is detected;
    decreasing said counter at a second predetermined rate when said spark knock is not detected; and
    decreasing said engine torque output and increasing said electric machine torque output based on said counter.

16. The method of claim 15 further comprising increasing and decreasing said counter within predetermined upper and lower limits.

17. The method of claim 15 wherein said first predetermined rate is greater than or equal to said second predetermined rate.

18. The method of claim 15 further comprising decreasing said engine torque output by a predetermined multiple of said counter and increasing said electric machine torque output by said predetermined multiple of said counter.

19. The method of claim 11 further comprising decreasing said engine torque output and increasing said electric machine torque output at a third predetermined rate.

20. The method of claim 11 further comprising:
    decreasing said engine torque output when said spark knock is detected and said cylinder is deactivated; and
    increasing said electric machine torque output when said spark knock is detected and said cylinder is deactivated.

* * * * *